US010325480B2

(12) United States Patent
Kayhani et al.

(10) Patent No.: US 10,325,480 B2
(45) Date of Patent: Jun. 18, 2019

(54) PROXIMITY ASSISTED SEAMLESS SERVICE (PASS)

(71) Applicant: Cubic Corporation, San Diego, CA (US)

(72) Inventors: Niosha Kayhani, Sutton (GB); Steffen Reymann, Guildford (GB); Gavin R. Smith, Crawley (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/052,424

(22) Filed: Aug. 1, 2018

(65) Prior Publication Data

US 2019/0043340 A1 Feb. 7, 2019

Related U.S. Application Data

(60) Provisional application No. 62/539,979, filed on Aug. 1, 2017.

(51) Int. Cl.
*G08B 25/10* (2006.01)
*H04W 4/021* (2018.01)
(Continued)

(52) U.S. Cl.
CPC ............ *G08B 25/10* (2013.01); *G06Q 10/10* (2013.01); *G06Q 50/10* (2013.01); *G08G 1/0962* (2013.01);
(Continued)

(58) Field of Classification Search
CPC ..... G08B 25/10; G08G 1/0962; H04W 4/022; H04W 4/38; H04W 4/42; H04W 4/029
See application file for complete search history.

(56) References Cited

U.S. PATENT DOCUMENTS

2009/0128320 A1 5/2009 Needham et al.
2011/0166997 A1* 7/2011 Dixon ................. G06Q 20/105
705/41

(Continued)

FOREIGN PATENT DOCUMENTS

WO 2017-072257 A1 5/2017

OTHER PUBLICATIONS

International Search Report and Written Opinion dated Oct. 1, 2018 in related Application No. PCT/US2018/044861, all pages.

*Primary Examiner* — Sisay Yacob
(74) *Attorney, Agent, or Firm* — Kilpatrick Townsend & Stockton LLP

(57) ABSTRACT

A mobile communications device for providing proximity-based assistance includes a communications interface, a processor, and a memory that is configured to store instructions thereon that cause a processor to register, at a first time, a user of the mobile device as needing a type of assistance. The instructions also cause the processor to broadcast, at a second time, a request for assistance. The request includes the type of assistance needed. The request is broadcast to helper devices that are within a predetermined proximity of the user. Each of the helper devices is associated with a corresponding user that is registered to assist with the particular type of assistance needed. The instructions cause the processor to receive an indication from a helper device that the corresponding user has accepted the help request, determine that the corresponding user has assisted the user, and notify staff that the user has been assisted.

18 Claims, 7 Drawing Sheets

(51) Int. Cl.
  *G08G 1/0962* (2006.01)
  *G06Q 10/10* (2012.01)
  *G06Q 50/10* (2012.01)
  *H04W 4/38* (2018.01)
  *H04W 4/42* (2018.01)
  *H04W 4/029* (2018.01)

(52) U.S. Cl.
  CPC ............ *H04W 4/022* (2013.01); *H04W 4/029* (2018.02); *H04W 4/38* (2018.02); *H04W 4/42* (2018.02)

(56) References Cited

U.S. PATENT DOCUMENTS

| | | | | |
|---|---|---|---|---|
| 2011/0238755 | A1* | 9/2011 | Khan | H04W 4/21 709/204 |
| 2011/0244928 | A1* | 10/2011 | Cherpes | H04M 3/5183 455/569.1 |
| 2012/0171988 | A1* | 7/2012 | Matsuo | H04L 12/1895 455/404.2 |
| 2013/0254304 | A1* | 9/2013 | Van Nest | H04L 67/04 709/206 |
| 2015/0156267 | A1* | 6/2015 | Zhang | H04W 4/02 709/223 |
| 2015/0269835 | A1* | 9/2015 | Benoit | G08B 25/016 340/539.13 |
| 2016/0099895 | A1* | 4/2016 | Crawford | H04L 12/1895 709/206 |
| 2016/0227510 | A1* | 8/2016 | Reed | H04W 8/02 |
| 2016/0231122 | A1* | 8/2016 | Beaurepaire | G01C 21/34 |
| 2016/0316503 | A1* | 10/2016 | Raphael | H04W 4/08 |
| 2017/0061512 | A1* | 3/2017 | Avcil | G06Q 30/0613 |

\* cited by examiner

PROXIMITY ASSISTED SEAMLESS SERVICE (PASS)

CROSS-REFERENCES TO RELATED APPLICATIONS

This application claims the benefit of U.S. Provisional Application No. 62/539,979, entitled "PROXIMITY ASSISTED SEAMLESS SERVICE (PASS)", filed on Aug. 1, 2017, the entire contents of which are hereby incorporated by reference.

BACKGROUND OF THE INVENTION

In public transit systems (utilizing subway, ferry, bus, etc.), disabled and/or elderly passengers frequently have to pre-plan their journey with station staff prior to beginning their travel. This can result in a journey experience is completely different to people without disabilities. Oftentimes these passengers may need assistance with finding a seat, sitting down, getting up, and/or other tasks necessary to utilize the transit vehicles in a safe, comfortable manner. To ease some of these burdens, transit systems often include staff that may assist users who are at transit stations/stops. However, oftentimes there may not be sufficient numbers of staff that can help with a particular disability. Oftentimes, given the lack of sufficient staff, such help must also be arranged for ahead of time, such as by the person with disabilities calling ahead, which may be difficult for impromptu transit rides. Additionally, the people with disabilities may require assistance mid-transit and not have access to any staff members who can assist them. Improvements in the area of assistance for elderly and disabled persons is desired.

BRIEF SUMMARY OF THE INVENTION

Embodiments of the present invention are directed to systems and methods for registering transit passengers as capable of assisting passengers with disabilities and for routing these registered passengers to passengers who need assistance that matches a type of disability a particular registered passenger is certified to assist with. These registered passengers may be guided to a user who needs assistance. In this way, users who need assistance mid-transit may still get assistance from qualified persons. Additionally, the number of identified persons available to help people with disabilities is greatly increased, and it is easier for the people with disabilities to ask for and receive help.

In one embodiment, a mobile communications device for providing proximity-based assistance is provided. The device may include a communications interface, at least one processor, and a memory that is configured to store instructions thereon that when executed cause the at least one processor to register, at a first time, a user of the mobile communications device as needing a type of assistance. The instructions may further cause the at least one processor to broadcast, at a second time, using the communications interface a request for assistance. The request may include the type of assistance needed. The request may be broadcast to a plurality of helper devices that are within a predetermined proximity of the user. Each of the portion of the plurality of helper devices that are within a predetermined proximity of the user may be associated with a corresponding user that is registered to assist with the particular type of assistance needed. The instructions may also cause the at least one processor to receive an indication from at least one of the plurality of helper devices that the corresponding user has accepted the help request, determine that the corresponding user has assisted the user, and notify staff at a destination station of the user that the user has been assisted.

In another embodiment, a mobile communications device for providing proximity-based assistance includes a communications interface, at least one processor, and a memory that is configured to store instructions thereon that when executed cause the at least one processor to broadcast, using the communications interface, a request for assistance. The request may include a type of assistance needed. The request may be broadcast to a plurality of helper devices that are within a predetermined proximity of the user. Each of the portion of the plurality of helper devices that are within a predetermined proximity of the user may be associated with a corresponding user that is registered to assist with the particular type of assistance needed. The instructions may also cause the at least one processor to determine that the corresponding user has moved within a threshold distance of the user. The threshold distance may be less that the predetermined proximity. The instructions may further cause the at least one processor to notify staff at a destination station of the user that the user has been assisted.

In another embodiment, a method for providing proximity-based assistance is provided. The method may include broadcasting, by a mobile communications device of a user, a request for assistance. The request may include a type of assistance needed. The request may be broadcast to a plurality of helper devices that are within a predetermined proximity of the user. Each of the portion of the plurality of helper devices that are within a predetermined proximity of the user may be associated with a corresponding user that is registered to assist with the particular type of assistance needed. The method may also include determining, by the mobile communications device, that the corresponding user has moved within a threshold distance of the user. The threshold distance may be less that the predetermined proximity. The method may further include notifying, by the mobile communications device, staff at a destination station of the user that the user has been assisted.

BRIEF DESCRIPTION OF THE DRAWINGS

A further understanding of the nature and advantages of various embodiments may be realized by reference to the following figures.

DETAILED DESCRIPTION OF THE INVENTION

Figure 1:
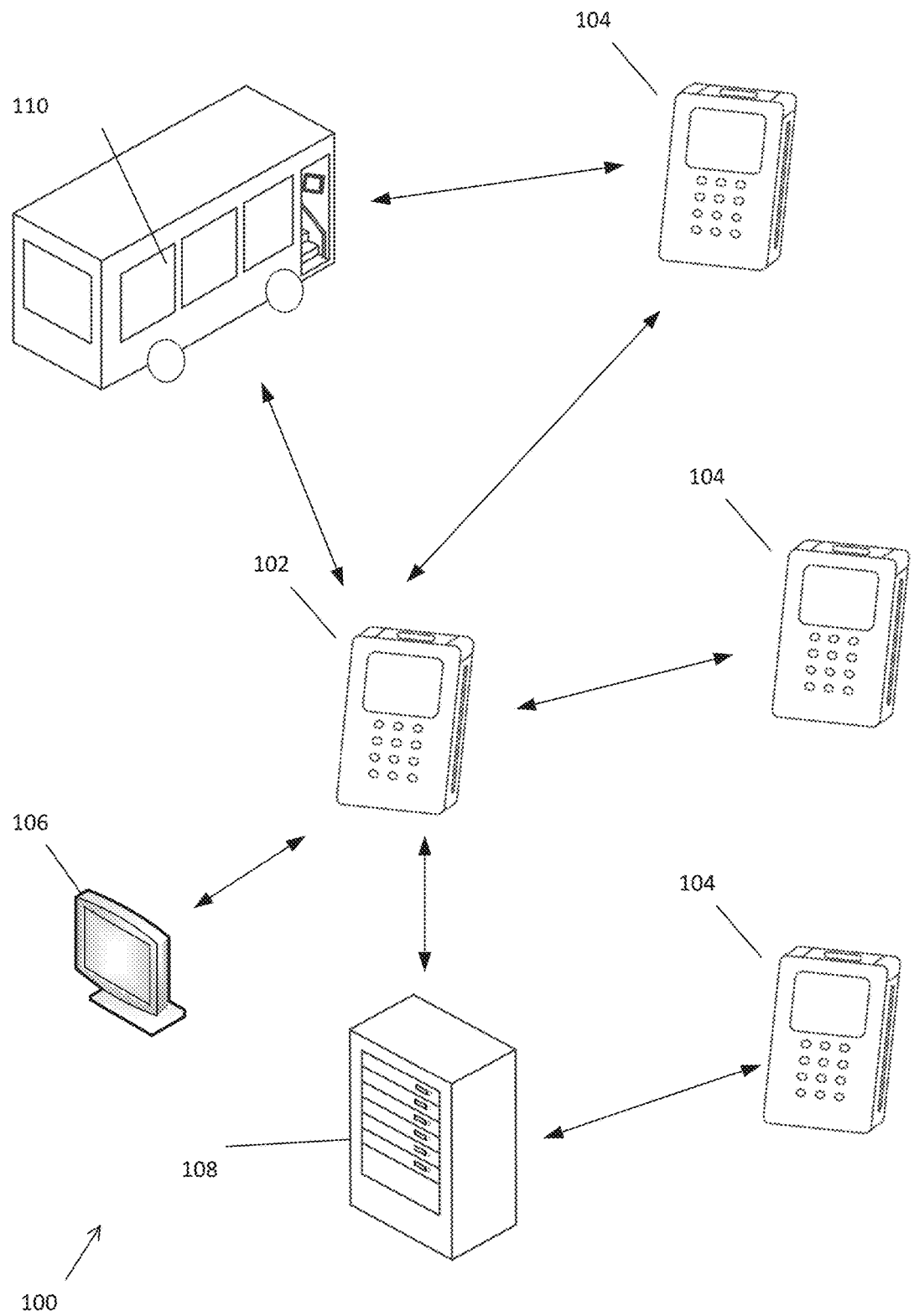
FIG. 1 is a system diagram of a system for providing proximity-based assistance according to embodiments.

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Embodiments of the present invention(s) described herein are generally related to the use of a mobile application as it relates to a transit system or other public service. More specifically, the use of a mobile application that can be used by disabled passengers to register their disability and that allows the general public to register themselves as "helpers." That said, a person of ordinary skill in the art will understand that alternative embodiments may vary from the embodiments discussed herein, and alternative applications may exist. For example, embodiments of proximity assisted seamless service (PASS) as described herein may be utilized in other public areas such as stadiums and other places where disabled people may not receive the same (expected) experiences everyone else. This may be utilized in other aspects such as health and safety, which may extend to those who may not have disabilities.

Embodiments of the invention(s) disclosed herein are directed toward enabling disabled passengers to have a closer level of experience for all passengers. According to embodiments, a mobile application (e.g., application executed by a mobile device, such as a smart phone, media player, tablet, and/or similar electronic device) can be used to enable disabled passengers to register their disability and enable the general public to register themselves as "helpers". These helpers, in some embodiments, may have completed specific types of training, which may be subject to official accreditation. These embodiments can be described as Proximity Assisted Seamless Service (PASS).

The premise is that the disabled passenger can, according to embodiments, ask for help by broadcasting a message (e.g., via a wireless technology, such as Bluetooth low energy (BLE), from their mobile device). One or more nearby devices (e.g., mobile devices of potential helpers) executing the application may receive the message and, if the potential helper(s) are accredited (and/or otherwise qualified) to aid with that particular type of disability, the potential helper(s) may then have the opportunity to help the disabled passenger.

According to some embodiments, the two passengers (the disabled passenger and the helper) could then match their devices and sync to ensure that the broadcasting ends. Alternative embodiments could disable the broadcast by other methods. The whole time, the destination station may be informed that the disabled passenger arriving at their station now has an on-board helper confirmed, at any point this is cancelled the stakeholders would be informed.

In some embodiments, the transit system may provide incentives to encourage people to register and serve as helpers. For example, once the helper has helped the disabled person, they can confirm this on their mobile device and this may credit the helper's account (e.g., donation to chosen charities in their name, discount vouchers or a small percentage off their journey, etc., depending on desired functionality).

According to some embodiments, choosing the helper from among of plurality of potential helpers could work on a first-come-first-serve basis. All details may have to be verified (i.e., disabilities may have to be proven with the rightful documentation, and helpers may require training, certification, etc., that a transit service or other entity could provide using any of a variety of training techniques).

According to some embodiments, the use of an application in this way (according to PASS) can be linked to a wider ticketing account that associates various forms of ticketing inside a single account. As such, this can ensure a more seamless ticketing purchase experience for disabled passengers.

The following description includes several flowcharts to help further illustrate how certain aspects of PASS may be implemented, according to some embodiments. A person of ordinary skill in the art will appreciate that various alternative techniques, components, and/or other aspects may be utilized, and that alternative embodiments are not limited to the particular aspect shown.

Embodiments of PASS as described herein can provide any of a variety of novelties over traditional transit systems. For instance, embodiments may involve gamifying the concept of helping the disabled and providing true proximity-based peer to peer assistance, which may increase participation and make the user experience for disabled passengers much better. Additionally, the techniques described herein can link disabled passengers to peers, transit vehicles and operators in real-time. Embodiments, may involve broadcasting (from a mobile device of a disabled passenger) a specific signal that may identify the passenger and/or the passenger's disability (e.g., the signal may be different for blind passengers, wheelchair-bound passengers, and/or passengers with other disabilities. The disabled passenger's device may find and/or successfully connect to a helper's device when (and only when, according to some embodiments) the helper's skillset matches with the disabled person's need. This may mean that the helper's identifier may be the same as the disabled passenger's. For instance, a blind person requesting help may not be partnered with a helper who only has certification to help people with walking impairments. Embodiments ensure that potential helpers to even be able to broadcast or even find disabled people calling for help—they may need to have passed the correct certification and training (e.g., each certificate may be understood as unlocking a new code to broadcast). Such embodiments leverage a solution that creates a 'Help as a Service' type model that would utilize the skills of people within a close proximity to opt-in to aid one another. Embodiments create a more seamless travel experience for disabled passengers (or disabled persons in other settings for non-transit applications). Embodiments of the present invention encourage the wider public to enroll into a system and train themselves to help one another.

Turning now to FIG. 1, a system 100 for providing proximity-based assistance is shown. System 100 includes a mobile device 102 (cellular phone, personal digital assistant, tablet computer, e-book, etc.) that is associated with a particular disabled person. The system 100 may include any number of mobile devices 102, which may each be associated with a different disabled person. Each mobile device 102 may have a mobile transit application downloaded onto the device. For example, the user may enroll his mobile device 102 for use in a transit ridership enhancement program. Enrollment may include creating an account and/or linking an existing transit account to the program. Oftentimes, the enrollment will include providing personal and/or payment data to the transit system. In some embodiments, prior to, during, or after enrollment, the transit system may provide a transit mobile application to the user. This may be done by downloading the mobile application directly onto the mobile device for installation and execution thereon. In some embodiments, the transit system may cause the mobile application to be downloaded onto the mobile device directly from a transit system server, while in other embodiments the transit system may provide a link or instructions to access a link to download the mobile application from a third-party server, such as an application library. The user may also enroll in the PASS program, such as by providing information that details a particular (or multiple) disability (which may include other accessibility issues) that the user has. In some embodiments, the user may simply submit a statement or check a box indicating the particular disability, while in other embodiments, the user must submit official documentation (medical records, physician notes, etc.) in order to register as a disabled passenger.

When needing assistance, the user may activate the mobile application on their mobile device 102 and input a request for assistance on a user interface of the mobile application. The mobile device 102 may then broadcast the request using a communications interface. The communications interface may include one or more wireless antenna such as Wi-Fi, Bluetooth™, Bluetooth™ Low Energy (BLE), near field communication (NFC), other radio frequency (RF) antennas, and the like. In some embodiments, the mobile device 102 will have a primary long range antenna, such as a BLE antenna that is used to broadcast the request, while a second, shorter range antenna is used for more close range communications. In other embodiments, a single antenna may be used for all types of communications. The broadcast request may include an identifier of the passenger and/or an identification of the passenger's disability (it will be appreciated that in some embodiments the transmitted disability may also include and/or be a particular task the user needs assistance with). In some embodiments, the request may be a specific signal is unique to a particular disability or set of disabilities. In some embodiments, location information of the mobile device 102 may be included in the request. For example, the mobile device 102 may share its coordinates from a global positioning satellite (GPS) module of the mobile device 102. In other embodiments, the mobile device may interact with one or more beacons or other communication sensors at the transit station and/or on the transit vehicle, which may be used to calculate a position of the mobile device 104. It will be appreciated that other location detection techniques may be used in accordance with the present invention.

The request signal may be broadcast to other devices, such as a number of helper devices 104 (cellular phone, personal digital assistant, tablet computer, e-book, etc.) that are carried by registered helpers within range of the signal containing the request, that is associated with a particular disabled person. The system 100 may include any number of helper devices 104, which may each be associated with a different helper. Each helper device 104 may have a mobile transit application downloaded onto the device. For example, the user may enroll his helper device 104 for use in a transit ridership enhancement program. Enrollment may include creating an account and/or linking an existing transit account to the program. Oftentimes, the enrollment will include providing personal and/or payment data to the transit system. In some embodiments, prior to, during, or after enrollment, the transit system may provide a transit mobile application to the user. This may be done by downloading the mobile application directly onto the mobile device for installation and execution thereon. In some embodiments, the transit system may cause the mobile application to be downloaded onto the mobile device directly from a transit system server, while in other embodiments the transit system may provide a link or instructions to access a link to download the mobile application from a third-party server, such as an application library. The user may also enroll as a helper in the PASS program, such as by providing information that details a particular (or multiple) disability (which may include other accessibility issues) that the user is qualified to assist with. In some embodiments, the user may simply submit a statement or check a box indicating the particular disability, while in other embodiments, the user must submit official documentation (certifications, training records, etc.) in order to register as a helper for a particular type(s) of disability.

In some embodiments, the transit system may offer online training via a website and/or through the mobile application. For example, game-based training may be offered through the application such that helpers may play/interact with game-like scenarios to learn how to assist with various tasks and/or disabilities. Some of the training may require a more hands on/practical level of training and certification in these areas may require physically attending classes.

In some embodiments, the request may be viewable by all helper devices 104 within certain proximity of the mobile device 102 (such as a signal range of the mobile device 102), but only can be accepted by those helper devices 104 associated with a helper that is certified or otherwise registered to assist with a particular disability included in the request. In other embodiments, the request is only viewable by helper devices 104 that are registered to assist with the particular disability included in the request. For example, in embodiments where the request is submitted via a BLE signal, the signal may be broadcast only to helper devices 104 that are associated with users who are certified to assist with the type of disability in the request. Helpers who see the request have the option to accept the request, thereby agreeing to help the disabled user. The helper device 104 may show a location of the mobile device 102 on a transit vehicle and/or within a transit station relative to the helper device 104, such as on a map of the environment displayed on a screen of the helper device 104. The mobile application being executed on the helper device 104 may determine an absolute and/or relative position of the helper device 104 by retrieving location data from the helper device 104 and comparing that to the location of the mobile device 102 and/or a known layout of the transit vehicle and/or station. In some embodiments, the mobile application on the helper device 104 may determine exactly what station/vehicle the two devices 102, 104 are at and may provide an augmented reality (AR) view on the screen of the helper device 104 that helps the helper navigate his way to the disabled user.

In some embodiments, to accept the request, a helper must interact with a user interface of the mobile application to actively accept the request and commit to helping the disabled user. In such embodiments, the acceptance may cause the broadcast of the request by the mobile device 102 to be paused to prevent additional helpers from trying to accept the request. In other embodiments, the acceptance of the request is based on a helper approaching the disabled user of the mobile device 102. This may be done by the helper device 104 and mobile device 102 communicating with one another and determining when the helper device 104 has come within a predetermined threshold distance (which is typically within a matter of feet, such as 1 foot, 3 feet, 5 feet, 10 feet, etc.) of the mobile device 102. This may be done in several ways. For example, the mobile device 102 and/or the helper device 104 may compare the location data from each respective device to calculate a distance between the two. In one particular example, the helper device 104 may utilize the location information of the mobile device 102 that are included in the request and compare the information to its own GPS data. In another embodiment, the helper device 104 and/or mobile device 102 may use received signal strength indication (RSSI) on signals exchanged between the devices to determine a relative distance between the two. Once the distance between the two devices is within the threshold, the helper device 104 may be considered to have accepted the request. At this point, the helper may assist the disabled user with whatever task(s) that are needed.

In some embodiments, the request may be closed upon a helper accepting the request, while in other embodiments the request may remain open until the disabled user has actually been assisted. In some embodiments, the mobile device 102 may determine that the disabled user has been assisted once the helper device 104 is within the threshold of the mobile device 102. In other embodiments, the disabled user may interact with a user interface of the mobile application to positively close the request.

In some embodiments, upon broadcasting the request, the mobile device 102 may transmit a message to one or more transit system devices 106 (such as station computers, portable accessibility staff devices, and the like) that indicates that a user has requested assistance. The message may include an identifier of the user, a location of the user, a type of disability, and/or other information. This message keeps the transit system informed of the user's need for assistance. The transit system devices 106 may be at the boarding station and/or the destination station. For example, if the messages go to someone at the boarding station prior to the transit vehicle departing, a staff member may assist the user. If the transit vehicle has departed or is about to depart, the message may go to a transit system device 106 at the destination station of the user, which allows the staff there to prepare to assist the user if assistance has not been provided by a helper. If assistance has been provided by a helper, the mobile device 102 may send an additional message to the transit system devices 106 informing the staff that assistance has been provided. Similarly, if a helper accepts the request but fails to render the necessary assistance, a message may be sent to the transit system devices 106 that informs the staff that assistance is still needed.

In cases where assistance was rendered by a helper, the mobile device 102 may communicate a message to a central computer or server 108 of the transit system that indicates the assistance, as well as an identifier of the helper/helper device 104. The server 108 may record this information and use it to provide an incentive or reward to the helper who rendered assistance to the user. For example, the server 108 may credit the helper's transit account (e.g., donation to chosen charities in their name, discount vouchers or a small percentage off their journey, etc., depending on desired functionality). In some embodiments, the server 108 may send a command to the helper device 104 to display a prompt for the helper to confirm he provided the assistance. Once confirmed, the benefit may be provided to the helper.

In some embodiments, upon broadcasting the request, the mobile device 102 may communicate with a transit vehicle 110 on which the mobile device 102 is or will be riding on. For example, the mobile device 102 may send a signal (which could be part of the broadcast request) to the vehicle 110 that informs the vehicle 110 that the user needs assistance. In some embodiments, this message may cause the vehicle 110 to make changes to user interfaces of signage and/or other devices based on the user's needs. For example, the vehicle 110 may change signage to help a helper navigate his way toward the user.

In some embodiments, rather than directly communicating with one another, the communications between the mobile device 102 and the helper device 104 may be routed through the transit vehicle 110 and/or server 108. For example, in some embodiments, the transit system (acting through the transit vehicle 110 and/or server 108) may control and/or otherwise facilitate the matching of helpers with users as discussed in greater detail in relation to FIG. 6 below.

Figure 2:
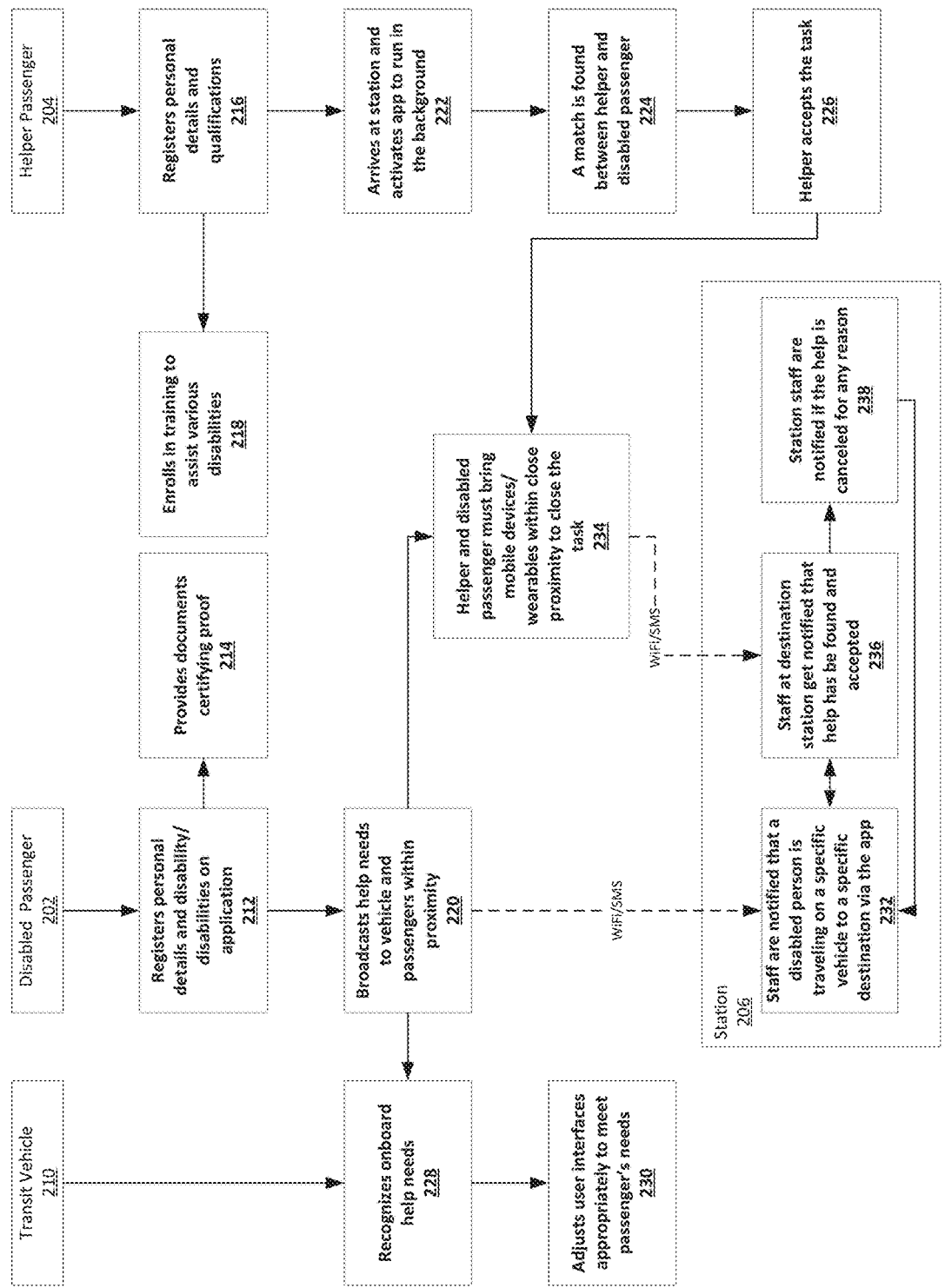
FIG. 2 illustrates a general process flow for a system for providing proximity-based assistance according to embodiments.

FIG. 2 shows a process flow of a system 200 for providing proximity-based assistance according to embodiments. System 200 includes a disabled passenger 202 (some or all of the functions of which may be performed using a mobile device such as mobile device 102), a helper passenger 204 ((some or all of the functions of which may be performed using a helper device such as mobile device 104), a transit vehicle 210 (which may be the same or similar to vehicle 110), and a transit station 206 (which may include staff devices 106). At block 212, the disabled passenger 202 may register as such by providing personal details and disability information on a mobile application executed on the passenger's mobile device. In some embodiments, the disabled passenger 202 must also provide documentation at block 214, such as medical records, physician's notes, etc. as proof of any disabilities that the disabled passenger is registering. In some embodiments, along with proof of the disability, the disabled passenger 202 may include details as to certain tasks the disabled passenger 202 may need help with (finding a seat, sitting down, standing up, exiting/boarding a vehicle, etc.).

The helper 204 may go through a similar enrollment process. For example, at block 216 the helper 204 may register personal details and any qualifications for assisting with one or more particular disabilities and/or tasks. This information may be provided through the mobile application executed on the helper's helper device. This may involve providing documentation, such as certification papers and/or training records for some or all of the disabilities and/or tasks the helper 204 is registering to assist with. In some embodiments, the helper 204 may enroll in and/or attend training on one or more disabilities/tasks at block 218. The training may be offered by the transit system and/or another entity. In some embodiments, the mobile application allows the helper 204 to enroll in training programs and/or have certificates or other proof of qualifications automatically uploaded to the helper's account. Any number of helper's may be registered, often with varying degrees and areas of experience. In some embodiments, the transit system may offer a reward or incentive for assisting disabled passengers 202. IN such embodiments, registration of each helper 204 may include selecting a preferred type of incentive. For example, each helper 204 may get to select a charity for a donation in the name of the helper 204 for each assist (or number of assists). In other embodiments, the helper 204 may be able to select a type of discount to receive for assisting disabled passengers 202.

At block 220, the disabled passenger 202 may arrive at a transit station and/or transit vehicle, open up their mobile application, and interact with the mobile device to broadcast an assistance request. The request may include a type of disability of the disabled passenger 202 and/or specific tasks the disabled passenger needs assistance with. This request may be broadcast wirelessly, such as using BLE and/or other wireless protocol. The request may be broadcast to the transit vehicle 210 and/or helpers 204 that are in a predetermined proximity of the disabled passenger 202. In some embodiments, the proximity may be based on a distance around the disabled passenger 202 set to be convenient for helpers 204 to arrive. In other embodiments, the proximity may be determined based on a signal range of the antenna broadcasting the request signal. In some embodiments, all helpers 204 within the proximity will be able to see the request, while in other embodiments only those helpers that are registered to assist with the particular passenger's disability are able to see the request. At block 222, a helper arrives at the transit station and/or vehicle 210 and activates his mobile application. In some embodiments, the mobile device may run in the background of his helper device. The helper 204 may get a notification when the disabled passenger 202 starts broadcasting the request at block 224. If the helper 204 has the correct qualifications, the helper 204 may accept the request and match with the disabled passenger 202 at block 226. In some embodiments, this may be an active acceptance through the mobile application, while in other embodiments, the helper 204 may accept the task by moving closer to the disabled passenger 202 until the two parties are within a predetermined threshold distance away from each other. The threshold distance may be shorter than the proximity of the request, and is typically a very short distance away, such as 1 foot, 3 feet, 5 feet, 10 feet, and the like.

While the request is broadcast, the transit vehicle 210 may detect the request and recognize that the disabled passenger 202 needs assistance at block 228. In response to this determination, the transit vehicle 210 may adjust user interfaces appropriately to meet the disabled passenger's needs. For example, the transit vehicle 210 may adjust signage to alert helpers 204 that a disabled passenger 202 needs assistance and to check their mobile applications, adjust the signage to inform helpers 204 where the disabled passenger 202 is, and/or otherwise adjust a user interface of one or more devices of the transit vehicle 210 to assist the disabled passenger 202 at block 230. This allows the staff at the destination station 206 to prepare for and anticipate helping the disabled passenger 202 upon arrival in the event that a helper 204 does not provide assistance.

Also while the request is being broadcast, staff of the vehicle 210, origination transit station, and/or destination transit station 206 may be notified that the disabled passenger 202 is traveling (or about to be traveling) on a particular transit vehicle 210 to a specific location at block 232. This information may be provided to the staff of the transit station 206 via the mobile application.

At block 234, once the helper 204 has accepted the task, the helper 204 and disabled passenger 202 may bring their respective mobile devices within close range of each other (the threshold). In some embodiments, this may constitute the acceptance and/or closure of the task by the helper 204, while in other affirmative acceptance and/or closure is necessary. In some embodiments, a short range communication is used to determine when the mobile devices are sufficiently close to one another, such as an NFC connection between the two devices. In other embodiments, the same protocol used for the request, such as BLE, may be used to determine whether the devices are sufficiently close, such as by using RSSI. The closure of the task may, in some embodiments, cause the mobile device of the disabled passenger 202 to stop broadcasting the request.

Upon closing the request, the transit station 206 may receive a notification that help has been notified and accepted at block 236. If, for some reason, the assistance is not actually provided, the transit station 206 may receive an indication of such inaction at block 238. If help is not rendered, the staff may be alerted to prepare to help the disabled passenger 202 upon arrival. Additionally, if help is not provided, a new request may be broadcast (or the original request may continue to be broadcast) to other helpers 204 to seek assistance.

Figure 3:
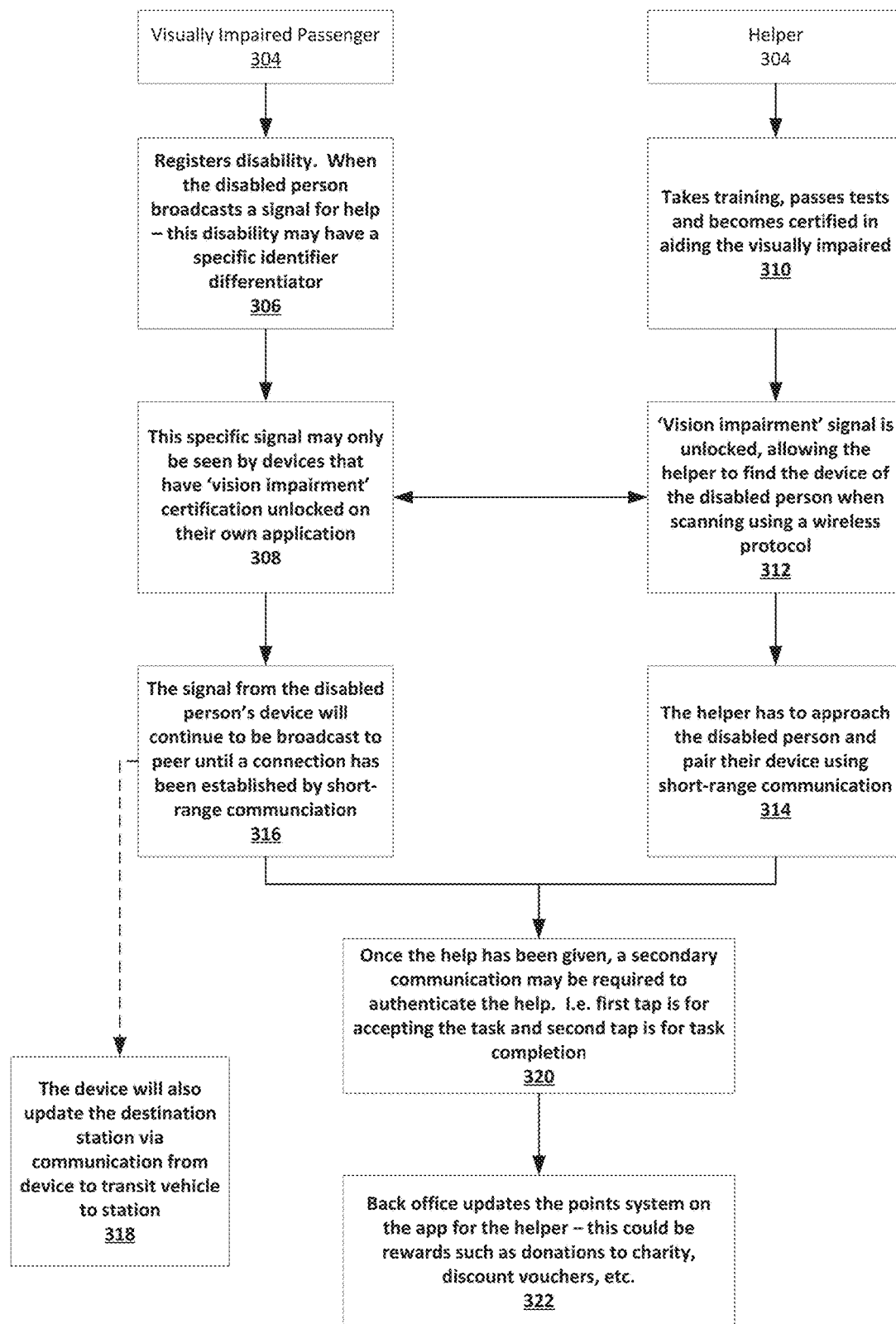
FIG. 3 illustrates a general process flow for a system for providing proximity-based assistance to a visually impaired passenger according to embodiments.

FIG. 3 is a flowchart of an example of process flow for providing assistance to a person having a visual impairment. It will be appreciated that the process flow described below is merely one particular example, and that variations may be made in accordance with the rest of the disclosure provided herein. Steps of the process may be performed by a mobile device, helper device, transit server, transit vehicle, staff device, and/or combinations thereof. The process may include a visually impaired passenger 302 registering as having a visual impairment and subsequently broadcasting a request for assistance at block 306. The request may include a unique identifier associated with the specific disability—here visual impairment. This specific request signal may only be seen by helper devices that have been registered with a visual impairment certification on their own mobile application at block 308. To register as helper 304 for a particular disability, a user must take some sort of training geared toward the particular disability—here visual impairment—and possibly may have to pass exams or other hurdles to become certified to assist with a particular disability/task at block 310. This unlocks the ability to receive a "visual impairment" assistance request signal at block 312. This allows the helper 304 to see and accept requests, and enables the helper 304 to find the mobile device of the visually impaired passenger 302.

The helper 304 may approach the visually impaired passenger 302 and pair (or otherwise communicate using) their respective devices using a (oftentimes short range NFC/BLE, etc.) wireless channel at block 314. Meanwhile, the request signal from the visually impaired passenger 302 may continue to broadcast until the connection is established between the two devices at block 316. While the request is broadcast, the mobile device of the visually impaired passenger will update a destination station as to the status of the request/assistance at block 318.

Once aid is rendered, a secondary communication may be required to authenticate the assistance. For example, at block 320 the helper 304 and/or visually impaired passenger 302 must provide an input of acceptance of a task and/or completion of a task. The secondary communication may be sent to a transit server or back office system that may update the profile of the helper 304 with a record of the assistance rendered and/or may credit the helper's account with some sort of incentive at block 322.

It will be appreciated that the flow described in relation to FIG. 3 is merely one example of a particular embodiment and that variations are possible. Moreover, while the flow will be similar for various disabilities/tasks, in some embodiments a particular disability/task may include additional steps.

Figure 4:
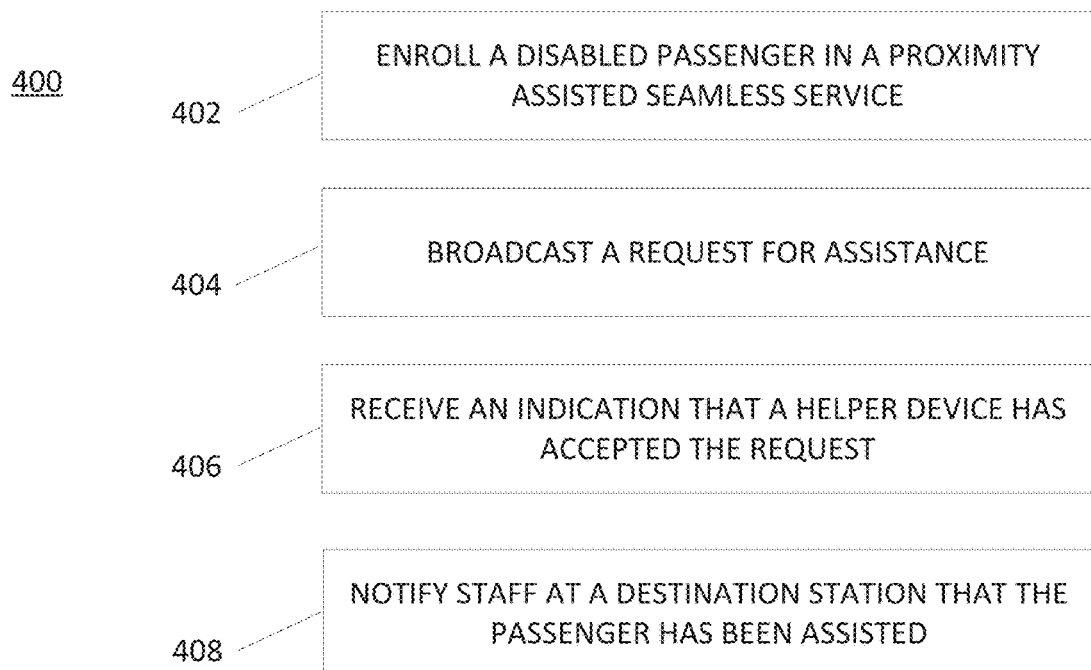
FIG. 4 is a flowchart for a process of providing proximity-based assistance according to embodiments.
Figure 5:
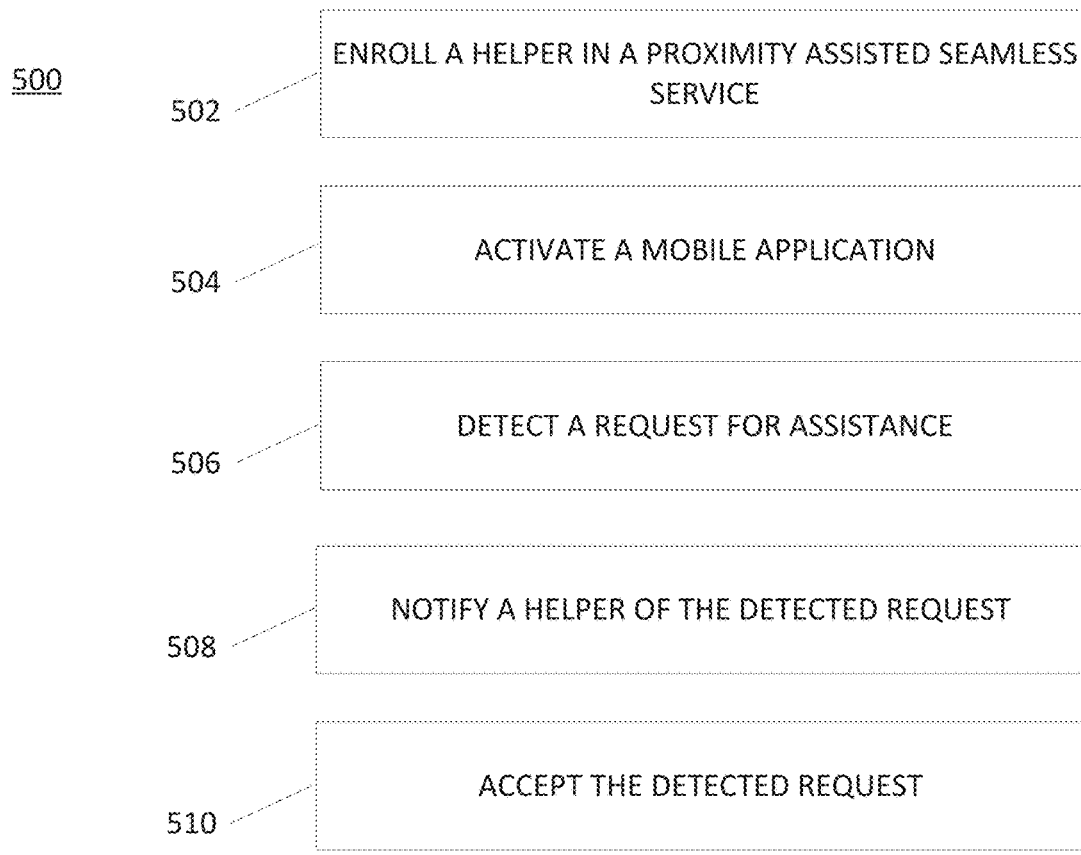
FIG. 5 is a flowchart for a process of providing proximity-based assistance according to embodiments.
Figure 6:
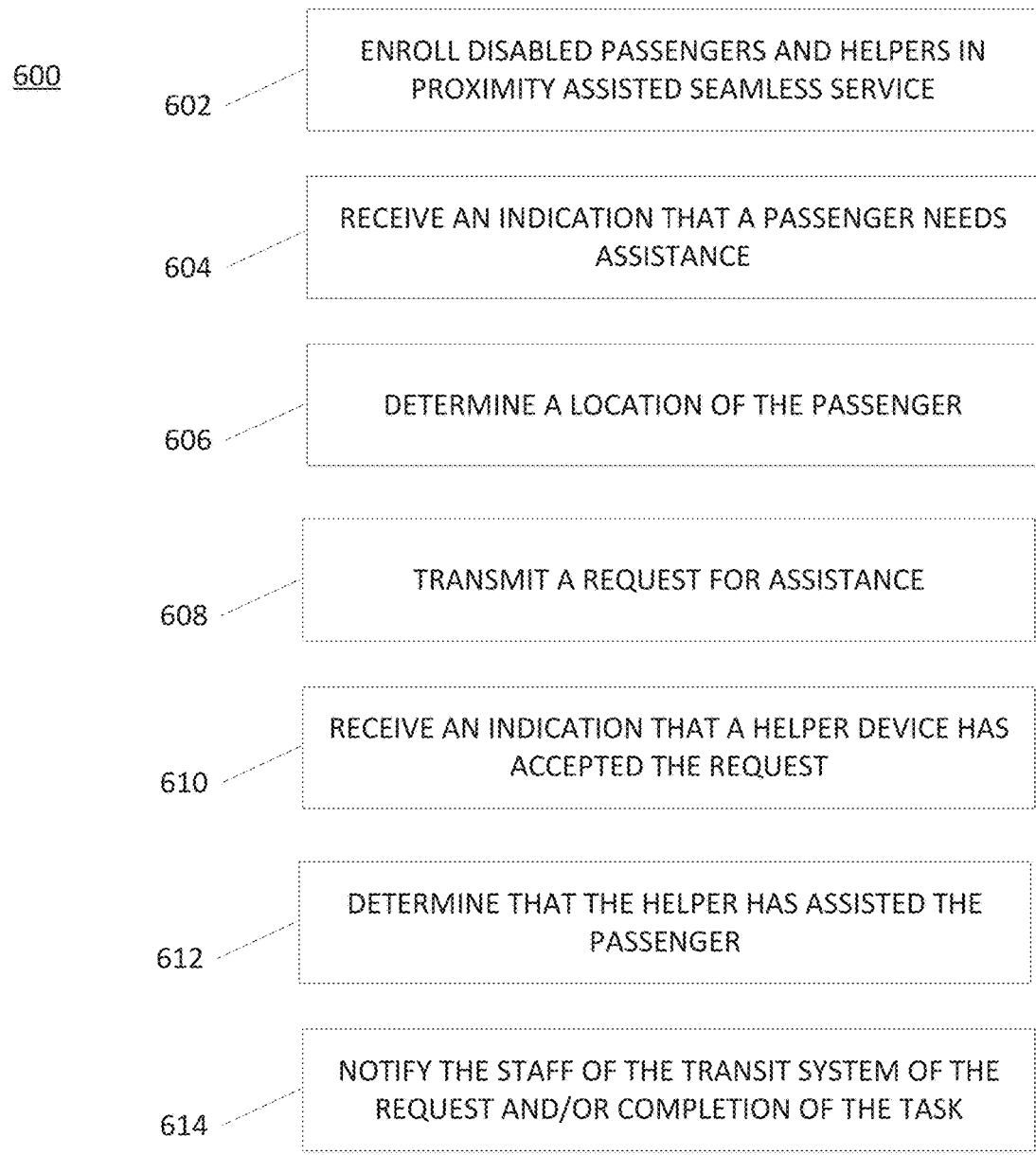
FIG. 6 is a flowchart for a process of providing proximity-based assistance according to embodiments.

The techniques for providing assistance to a person having a disability may be performed in a number of ways. For example, the process may be performed largely by mobile devices and helper devices, while in some embodiments, the processes may be facilitated and/or directed by a transit system, such as through a transit server and/or on-board vehicle computer. FIGS. 4-6 depict techniques for proximity assisted seamless service from various perspectives.

FIG. 4 is a flowchart depicting a process 400 for providing proximity-based assistance. Process 400 may be performed by a mobile device of a disabled passenger, such as mobile device 102 and/or disabled person 202/302. The process 400 may begin at block 402 by enrolling the disabled passenger in a proximity assisted seamless service. This may be done by registering the passenger as needing a particular type of assistance and/or having a particular type of disability. In some embodiments, the passenger may input this information (and possibly documentation serving as proof of the disability) into a mobile application on the mobile device. As the passenger approaches a transit station and/or transit vehicle, the passenger may execute the mobile application and input a request for assistance. The request may include a type of the disability(ies), a task(s) the passenger needs assistance with, a location of the passenger (which may be retrieved from the mobile device automatically by the mobile application), an identifier of the passenger, and/or other information that may be useful in matching the passenger with a nearby qualified helper. The request may be broadcast by the mobile device at block 404. The broadcast may be broadcast as a wireless signal from an antenna of the mobile device to helper devices that are within a predetermined proximity of the mobile device. In some embodiments, the signal may only be broadcast to helper devices that are registered to help with the disability/task present within the proximity, while in other embodiments all helpers within the proximity may receive the request. In some embodiments, the request is continuously broadcast until a determination is made that the passenger has been assisted, while in other embodiments the request may be terminated upon a helper accepting the request.

In some embodiments, the mobile device may transmit a command to a transit vehicle on which the mobile device is present that causes the transit vehicle to modify at least one user interface based on broadcasting the request. For example, the mobile device may cause a signage change on the vehicle. In some embodiments, rather than transmitting a separate command, this instruction may be part of the original request that is being broadcast. Additionally, the request (or an additional command) may include a notification for staff of the transit system that the passenger is traveling using a particular transit vehicle upon receiving the indication that the passenger needs assistance.

In some embodiments, the mobile device may receive an indication from a helper device that a helper has chosen to accept the request for assistance at block 406. In other embodiments, acceptance is performed by the helper just showing up and rendering aid. In such embodiments, the mobile device of the passenger may determine that the helper has moved within a threshold distance of the passenger. The threshold distance is less that the predetermined proximity and is often within a range of a few feet. In some embodiments, the request and the determination of the proximity may be performed by a single wireless protocol, such as, but not limited to BLE. For example, the determination that the devices are within proximity of one another may be based on RSSI and/or location information sharing between the devices. In other embodiments, the mobile device includes a first wireless antenna operating at a first signal range and a second wireless antenna operating at a second signal range that is shorter than the first signal range. For example, the request may be broadcast using the first wireless antenna such as BLE, while the second antenna, such as NFC, may receive a communication from the accepting helper's helper device. The mobile device may determine that the corresponding user has moved within the threshold distance of the user based on this communication. For example, in the case of NFC, merely by being within communication range of one another, the devices may be considered within proximity of one another given the very short communication range of NFC. It will be appreciated that other wireless protocols may be used in a similar manner, especially if they are or can be range limited. In some embodiments, At block 408, the mobile device may notify staff at a destination station of the user that the user has been assisted. In some embodiments, this may occur by the passenger providing an input to his mobile device that assistance was rendered. This input may cause a confirmation message to be transmitted to the staff. In some embodiments, this confirmation message includes an identifier of the helper and/or helper device that assisted the user. Such identifier may be provided during the interaction between the devices that indicates that the two devices are within proximity of one another. In embodiments where no assistance is rendered (regardless of whether the request was accepted), the passenger may provide an input to his mobile device that indicates that he has not been assisted. This input may be transmitted to the station staff so that they can work to rectify the situation.

FIG. 5 is a flowchart depicting a process 500 for providing proximity-based assistance. Process 500 may be performed by a helper device of a helper, such as helper device 104 and/or helper 204/304. The process 500 may begin at block 502 by enrolling the helper in a proximity assisted seamless service. This may be done by registering the helper as being qualified to render a particular type of assistance and/or qualified to help people having a particular type of disability. In some embodiments, the helper may input this information (and possibly documentation serving as proof of his qualifications) into a mobile application on his helper device. As the helper approaches a transit station and/or transit vehicle, the passenger may execute the mobile application at block 504, which may run in the background of his helper device. When a nearby disabled sure broadcasts a request for assistance, the helper device may detect this request at block 506 and notify the helper at block 508. For example, the helper device may get a push notification, SMS, and/or other electronic notification that causes the helper device to output an audio, visual, and/or haptic alert (such as vibration) that alerts the helper that a passenger needs assistance who has a disability/task the helper is qualified to assist with. The request may include a type of the disability(ies), a task(s) the passenger needs assistance with, a location of the passenger, an identifier of the passenger, and/or other information that may be useful in matching the passenger with the qualified helper. In some embodiments, the request may be continuously detected by the helper device until the assistance has been rendered, while in other embodiments, upon acceptance of the request by a helper, the broadcast of the request by the passenger's mobile device may be paused or canceled. The helper may view the request and choose to accept the request at lock 510. Accepting the request may involve the helper actively selecting an icon to indicate acceptance. In other embodiments, the helper may just move toward the location of the disabled passenger, and upon getting within a certain proximity, be deemed to have accepted the request. As explained above, this may be done by exchanging data through short range communications such as NFC, using RSSI, comparing location/coordinate data, and/or other location determining techniques.

In some embodiments, to make it easier for the helper to navigate to the passenger, the mobile application may present a map and/or AR representation of the environment (transit station/vehicle) along with relative locations and possibly instructions on how to navigate to the passenger. In some embodiments, this interface may be provided on a request screen or after selecting an option to see more details about a particular request, while in other embodiments this may be provided after a helper has actively accepted a request. In some embodiments, the passenger's location may be shared with the helper device via an active share mechanism, such as a virtual pin drop where the pin represents the passenger's location.

Once the assistance has been rendered, the request may be closed. In some embodiments, the helper may have to actively confirm that the assistance was rendered. Upon completion of the assistance, in some embodiments the helper device may receive an indication that the transit system has credited an account and/or charity of the helper with an incentive and/or has provided the user with some other reward.

FIG. 6 is a flowchart depicting a process 600 for providing proximity-based assistance. Process 600 may be performed by a transit system, such as a transit server and/or transit vehicle computer such as described elsewhere herein. The process 600 may begin at block 602 by enrolling a number of disabled passengers and a number of helpers in a proximity assisted seamless service. For example, each disabled passenger may provide the transit system with a type of disability and/or tasks that they need assistance with, possibly needing to include documentation showing proof of the disability. Similarly, the helpers must each provide the transit system with a list of disabilities and/or tasks that they are qualified to assist with, oftentimes needing to show proof of their qualifications. At block 604, the transit system receives an indication that a passenger needs assistance from a mobile communications device of the user. The indication may include a type of the disability(ies), a task(s) the passenger needs assistance with, a location of the passenger (which may be retrieved from the mobile device automatically by the mobile application), an identifier of the passenger, and/or other information that may be useful in matching the passenger with a nearby qualified helper, and/or other information that is relevant to matching the passenger with a relevant helper. A location of the passenger may be determined at block 606. This may be done, for example, based on location data from the mobile device that is included in the indication. In other embodiments, this may be done using beacons at the transit station and/or vehicle to communicate with the mobile device such that RSSI and/or triangulation may be used to identify a location of the passenger.

After the passenger's location is determined, a request for assistance may be transmitted to helper devices within a predetermined proximity of the passenger at block 608. In some embodiments, only those helper devices that associated with a corresponding user that is registered to assist with the particular disability/type of assistance needed may be provided the request. At block 610, the transit system may receive an indication from at least one of the plurality of helper devices that the corresponding user has accepted the help request. In some embodiments, this may involve receiving an input from a helper device informing the transit system that a particular helper has agreed to help. In other embodiments, the acceptance of the help request may be determined by a particular helper device moving within a close proximity of the disabled passenger. For example, location data from the helper device (provided by the mobile application) and location data from the mobile device (such as from the indication) may be compared to determine that the devices are within a close proximity to one another. In other embodiments, the mobile device and the helper device may communicate with one another to determine when they are proximate one another. Then one or both of the devices may alert the transit system of their proximity.

At block 612, the transit system may determine that helper has assisted the passenger. This may be done by detecting that the devices are in proximity with one another. In other embodiments, this may be done by receiving an indication of the completion of the task from the mobile device and/or the helper device. The staff of the destination station may be notified of the request and/or the completion of the task at block 614.

It will be appreciated that various technologies may be used for the various notifications/alerts described herein. For example, short message service (SMS), push notifications, emails, social media messages, and/or other messaging protocols may be used to transmit the various alerts.

Figure 7:
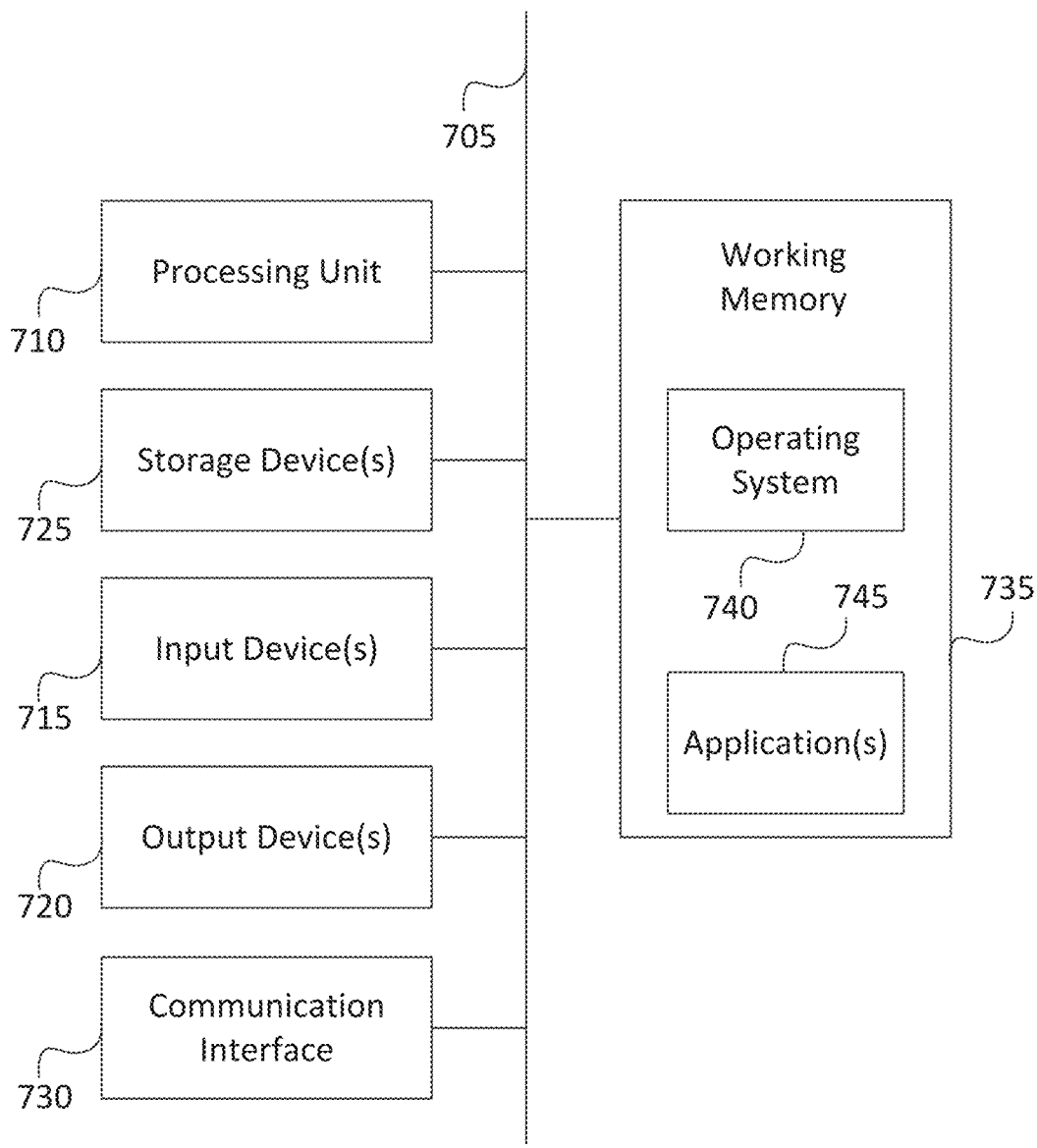
FIG. 7 is a block diagram of a computer system according to embodiments.

A computer system as illustrated in FIG. 7 may be incorporated as part of the previously described computerized devices. For example, computer system 700 can represent some of the components of the transit system, transit vehicle computer, mobile device 102, helper device 104, transit station devices 106, transit server 108, transit vehicle 110 and the like described herein. FIG. 7 provides a schematic illustration of one embodiment of a computer system 700 that can perform the methods provided by various other embodiments, as described herein. FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include a processing unit 710, including without limitation one or more processors, such as one or more special-purpose processors (such as digital signal processing chips, graphics acceleration processors, and/or the like); one or more input devices 715, which can include without limitation a keyboard, a touchscreen, receiver, a motion sensor, a camera, a smartcard reader, a contactless media reader, and/or the like; and one or more output devices 720, which can include without limitation a display device, a speaker, a printer, a writing module, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communication interface 730, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 730 may permit data to be exchanged with a network (such as the network described below, to name one example), other computer systems, and/or any other devices described herein. In many embodiments, the computer system 700 will further comprise a non-transitory working memory 735, which can include a RAM or ROM device, as described above.

The computer system 700 also can comprise software elements, shown as being currently located within the working memory 735, including an operating system 760, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 710, applications 745, etc.) Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processing unit 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processing unit 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processing unit 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire, and fiber optics, including the wires that comprise the bus 705, as well as the various components of the communication interface 730 (and/or the media by which the communication interface 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a non-transitory storage device 725 either before or after execution by the processing unit 710.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A mobile communications device for providing proximity-based assistance, comprising:
    a communications interface;
    at least one processor; and
    a memory that is configured to store instructions thereon that when executed cause the at least one processor to:
        register, at a first time, a user of the mobile communications device as needing a type of assistance;
        broadcast, at a second time, using the communications interface a request for assistance, the request comprising the type of assistance needed, wherein the request is broadcast to a plurality of helper devices that are within a predetermined proximity of the user, wherein each of the portion of the plurality of helper devices that are within a predetermined proximity of the user is associated with a corresponding user that is registered to assist with the particular type of assistance needed;
        receive an indication from at least one of the plurality of helper devices that the corresponding user has accepted the help request;
        determine that the corresponding user has assisted the user, wherein:
            the determination is made, at least in part, by determining that the helper device of the corresponding user has moved within a threshold distance of the user based on a communication being exchanged between the mobile communications device and the at least one of the plurality of helper devices using a near field communication (NFC) antenna of the communications interface; and
            the threshold distance is less that the predetermined proximity; and
        notify staff at a destination station of the user that the user has been assisted.

2. The system for providing proximity-based assistance of claim 1, wherein the instructions further cause the at least one processor to:
    notify the staff that the user is traveling using a particular transit vehicle upon receiving the indication that the user needs assistance.

3. The system for providing proximity-based assistance of claim 1, wherein the instructions further cause the at least one processor to:

receive an input indicating that the user that the user has not been assisted; and notify the staff that the user has not been assisted.

4. The system for providing proximity-based assistance of claim 1, wherein:

determining that the corresponding user has assisted the user comprises receiving a confirmation input at a user interface of the mobile communications device.

5. The system for providing proximity-based assistance of claim 1, wherein the instructions further cause the at least one processor to:

transmit a command to a transit vehicle on which the mobile communications device is present that causes the transit vehicle to modify at least one user interface based on broadcasting the request.

6. The system for providing proximity-based assistance of claim 1, wherein:

the request is continuously broadcast until the determination that the corresponding user has assisted the user.

7. A mobile communications device for providing proximity-based assistance, comprising:

a communications interface;

at least one processor; and a memory that is configured to store instructions thereon that when executed cause the at least one processor to:

broadcast, using the communications interface, a request for assistance, the request comprising a type of assistance needed, wherein the request is broadcast to a plurality of helper devices that are within a predetermined proximity of the user, wherein each of the portion of the plurality of helper devices that are within a predetermined proximity of the user is associated with a corresponding user that is registered to assist with the particular type of assistance needed;

determine that the corresponding user has moved within a threshold distance of the user based on a communication being exchanged between the mobile communications device and at least one of the plurality of helper devices using a near field communication (NFC) of the communications interface, wherein the threshold distance is less that the predetermined proximity; and notify staff at a destination station of the user that the user has been assisted.

8. The system for providing proximity-based assistance of claim 7, wherein the instructions further cause the at least one processor to:

transmit a command to a transit vehicle on which the mobile communications device is present that causes the transit vehicle to modify at least one user interface based on broadcasting the request.

9. The system for providing proximity-based assistance of claim 7, wherein:

the communications interface comprises a first wireless antenna operating at a first signal range and a second wireless antenna operating at a second signal range that is shorter than the first signal range; and the request is broadcast using the first wireless antenna.

10. The system for providing proximity-based assistance of claim 9, wherein:

determining that the corresponding user has moved within the threshold distance of the user comprises receiving a communication using the second wireless antenna from a particular one of the plurality of helper devices associated with the corresponding user.

11. The system for providing proximity-based assistance of claim 10, wherein:

determining that the corresponding user has moved within the threshold distance of the user further comprises determining a signal strength of the communication; and determining that the corresponding user has moved within the threshold distance of the user is based at least in part on the signal strength.

12. The system for providing proximity-based assistance of claim 7, wherein:

the request comprises a location of the user.

13. A method for providing proximity-based assistance, comprising:

broadcasting, by a mobile communications device of a user, a request for assistance, the request comprising a type of assistance needed, wherein the request is broadcast to a plurality of helper devices that are within a predetermined proximity of the user, wherein each of the portion of the plurality of helper devices that are within a predetermined proximity of the user is associated with a corresponding user that is registered to assist with the particular type of assistance needed;

determining, by the mobile communications device, that the corresponding user has moved within a threshold distance of the user based on a communication being exchanged between the mobile communications device and at least one of the plurality of helper devices using a near field communication (NFC) of the communications interface, wherein the threshold distance is less that the predetermined proximity; and notifying, by the mobile communications device, staff at a destination station of the user that the user has been assisted.

14. The method for providing proximity-based assistance of claim 13, wherein:

the request comprises an identifier of the passenger.

15. The method for providing proximity-based assistance of claim 13, further comprising:

registering the user of the mobile communications device as needing a type of assistance prior to broadcasting the request.

16. The method for providing proximity-based assistance of claim 13, further comprising:

receiving an input on a user interface of the mobile communications device; and transmitting a confirmation message to the staff that the user has been assisted.

17. The method for providing proximity-based assistance of claim 13, wherein:

the mobile communications device comprises a first wireless antenna operating at a first signal range and a second wireless antenna operating at a second signal range that is shorter than the first signal range; and the request is broadcast using the first wireless antenna.

18. The method for providing proximity-based assistance of claim 17, wherein:

determining that the corresponding user has moved within the threshold distance of the user comprises receiving a communication using the second wireless antenna from a particular one of the plurality of helper devices associated with the corresponding user.

* * * * *